(12) United States Patent
Kohl et al.

(10) Patent No.: US 6,644,737 B2
(45) Date of Patent: Nov. 11, 2003

(54) VEHICLE SEAT

(75) Inventors: Josef Kohl, Hirschau (DE); Manfred Meier, Burglengenfeld (DE); Holger Raum, Sulzbach-Rosenberg (DE)

(73) Assignee: Grammer AG, Amberg (DE)

( * ) Notice: Subject to any disclaimer, the term of this patent is extended or adjusted under 35 U.S.C. 154(b) by 0 days.

(21) Appl. No.: 10/167,685

(22) Filed: Jun. 11, 2002

(65) Prior Publication Data

US 2002/0190560 A1 Dec. 19, 2002

(30) Foreign Application Priority Data

Jun. 16, 2001 (DE) .......................................... 101 29 127

(51) Int. Cl.[7] ................................................ A47C 7/62
(52) U.S. Cl. .................... 297/217.1; 297/309; 297/311; 297/344.15; 248/542
(58) Field of Search .......................... 297/217.1, 217.2, 297/311, 344.1, 344.15; 248/542, 543, 550

(56) References Cited

U.S. PATENT DOCUMENTS 3,888,451 A * 6/1975 Lacey
4,029,283 A * 6/1977 Swenson et al.
4,264,050 A * 4/1981 Wahls
5,169,112 A * 12/1992 Boyles et al.
5,975,508 A * 11/1999 Beard
6,264,163 B1 * 7/2001 Ivarsson

FOREIGN PATENT DOCUMENTS

EP 0282656 * 9/1988

* cited by examiner

Primary Examiner—Laurie K. Cranmer
(74) Attorney, Agent, or Firm—Elliott M. Olstein; Raymond J. Lillie

(57) ABSTRACT

A vehicle seat comprises a seat squab supported on a base structure, and a spring arrangement for weight adjustment, the spring arrangement being connected to a weight adjustment actuating device. Associated with the actuating device is a level indicator device for indicating adjustment of the seat squab to the seat squab level which optimally corresponds to the weight of the respective seat occupant, in relation to the spring travel of the seat squab. The level indicator device and the actuating device are provided at least substantially centrally at the front edge of the seat squab for optimum actuability and adjustability.

10 Claims, 4 Drawing Sheets

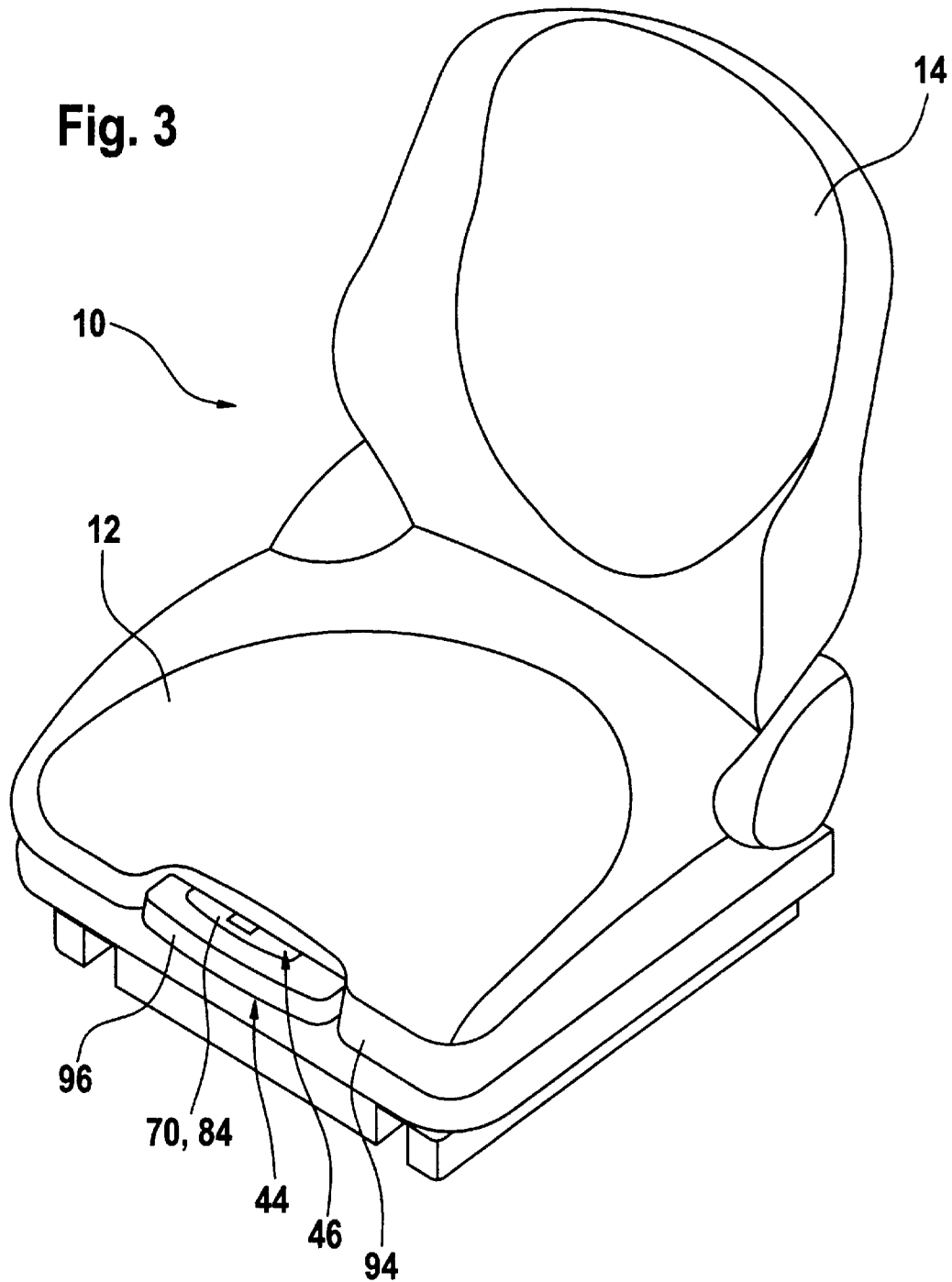

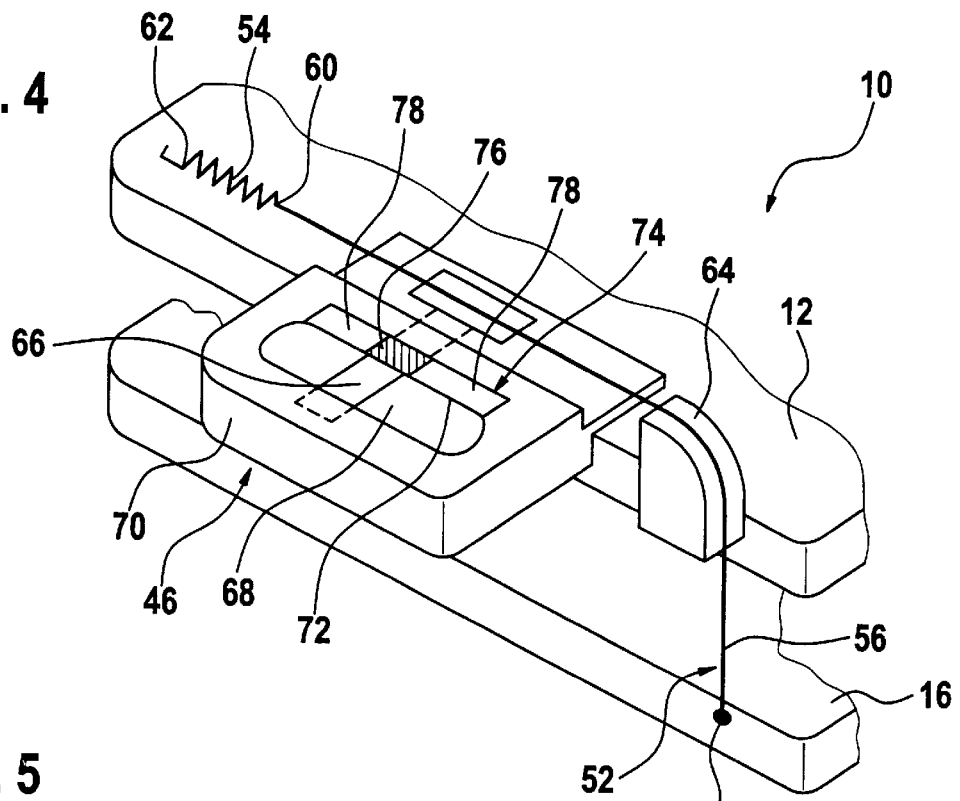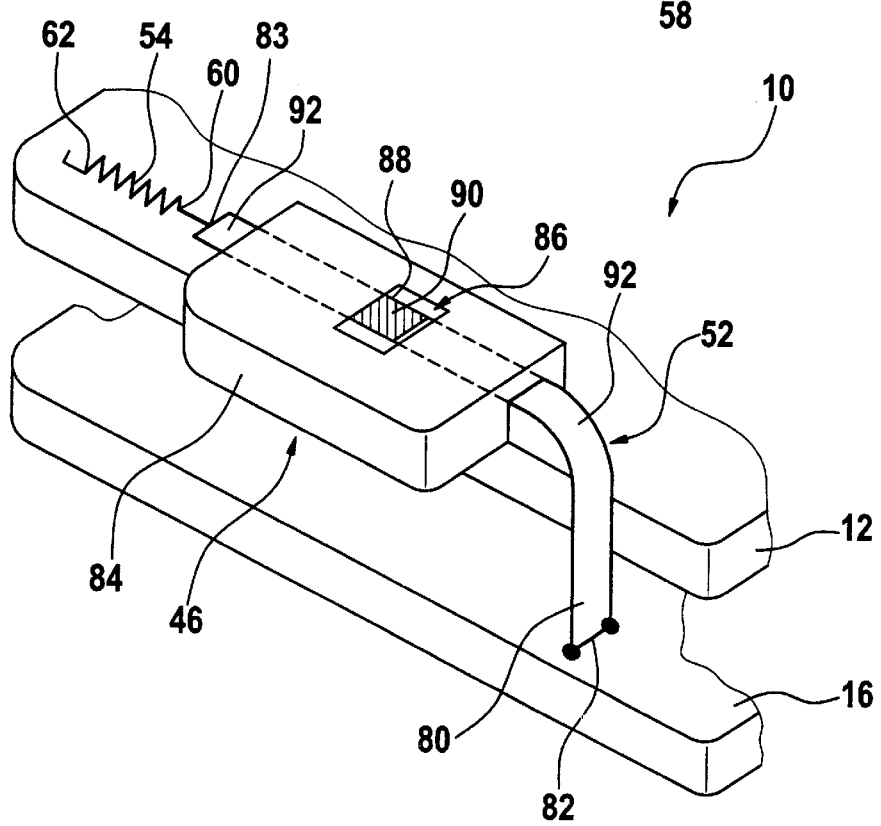

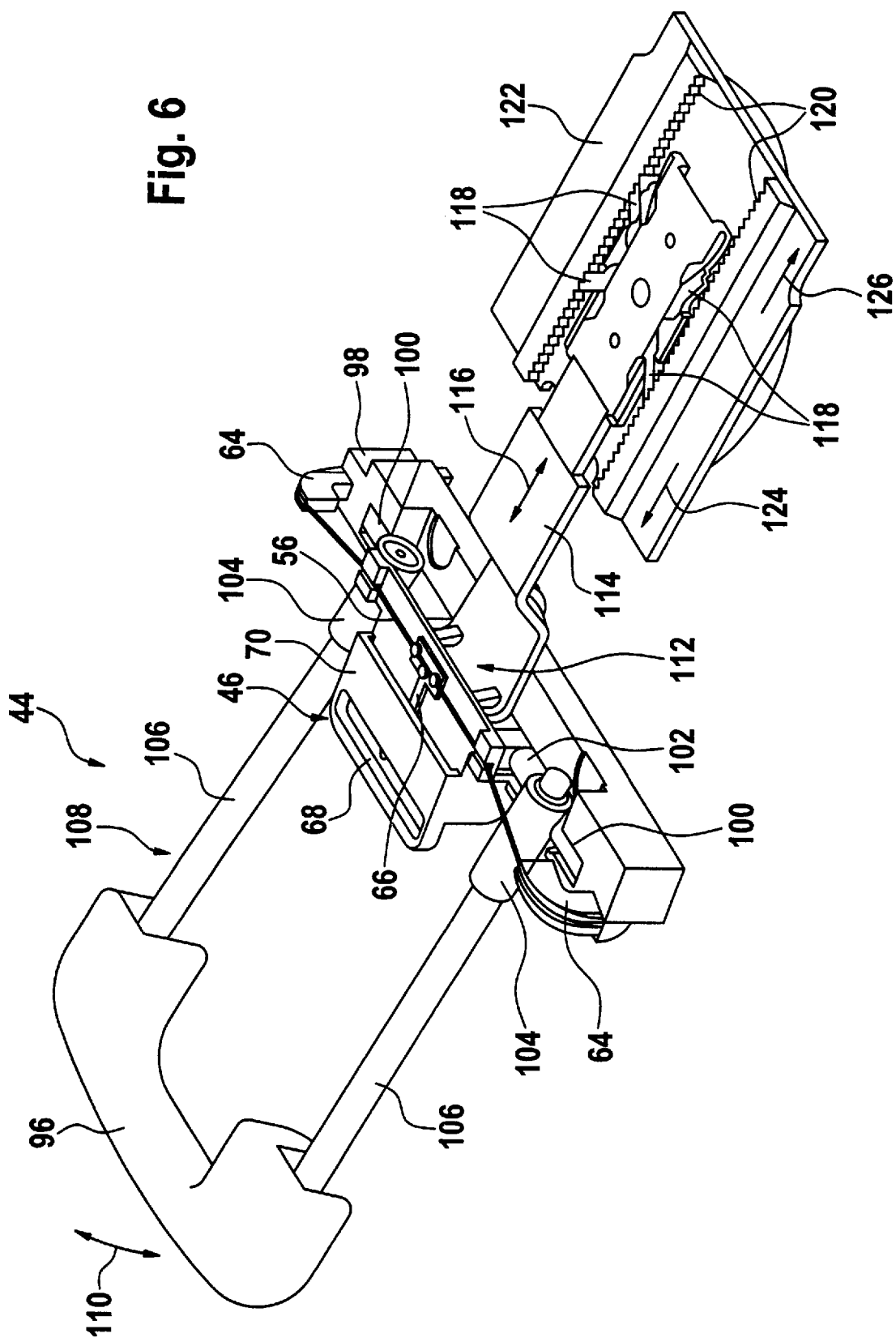

VEHICLE SEAT

FIELD OF THE INVENTION

The invention concerns a vehicle seat and more particularly a vehicle seat incorporating spring support.

BACKGROUND OF THE INVENTION

A form of vehicle seat which incorporates spring support comprises a seat squab supported on a base structure, and a spring arrangement for weight adjustment. The spring arrangement is connected to a weight adjustment actuating means. Such a vehicle seat, which can be typically used for example in trucks, tractors and building machines, can be adjusted for example to between 50 and 130 kg weight of the respective seat occupant, by means of the weight adjustment actuating means. In that respect however weight adjustment of the vehicle seat is effected only in accordance with the estimated weight of the respective seat user. If however the weight of the seat user has changed by virtue of that person gaining weight or losing weight or as a result of the weight of the clothing of the seat occupant, hitherto it has not been possible to implement optimum weight adjustment of the vehicle seat. That in turn has the consequence that the springing of the vehicle seat, that is to say the springing for the seat squab itself, in relation to the supporting base structure, is not set to its optimum. This therefore means that the springing of the vehicle seat is not implemented in the optimum range of oscillation movement of the vehicle seat. Either the springing of the vehicle seat by means of the spring arrangement provided for weight adjustment is set at too hard a value so that the oscillation travel or spring travel is above the optimum travel and the amplitude of the pivotal movement of the seat squab is small, or the spring arrangement is set at too soft a value so that the oscillation or spring travel is below the optimum value.

SUMMARY OF THE INVENTION

An object of the present invention is to provide a vehicle seat which permits simple actuation for adjusting the seat to the respective weight of the seat user in a very reliable and secure fashion in order to afford optimum vehicle seat springing.

Another object of the present invention is to provide a vehicle seat incorporating adjustable springing, which affords simple optimum adjustment of the springing effect of the vehicle seat for adaptation to the weight of the seat occupant.

Still another object of the present invention is to provide a vehicle seat incorporating a mechanism for adjusting the seat squab to the optimum position for operationally appropriate functioning of the spring arrangement supporting the seat squab, while affording simplicity of operation on the part of the seat occupant.

In accordance with the principles of the present invention the foregoing and other objects are attained by a vehicle seat comprising a seat squab which is supported on a base structure, with a spring arrangement for weight adjustment in respect of the seat squab, wherein a weight adjustment actuating means is operatively connected to the spring arrangement for weight adjustment. Associated with the weight adjustment actuating means is a level indicator means which serves to indicate the adjustment setting of the seat squab to the seat squab level or height optimally corresponding to the weight of the respective seat occupant in relation to the spring travel of the seat squab. The level indicator means and the weight adjustment actuating means are disposed at least substantially centrally at the edge of the seat squab which in use of the vehicle seat is the front edge thereof.

By virtue of the level indicator means in the vehicle seat of the invention, it is easily and reliably possible to accurately appropriately adjust the spring arrangement for weight adjustment, in such a way that accurate adaptation of the springing of the vehicle seat to the actual weight of the respective seat occupant is possible. In that case the weight adjustment actuating means is actuated specifically by the respective seat occupant until the level indicator means indicates the seat squab level which is the optimum setting in relation to the spring travel of the sprung seat squab. In that case the seat squab of the vehicle seat, in operation of the vehicle, performs a sprung movement in the optimum spring travel range.

The fact that, in accordance with the invention, the level indicator means and the weight adjustment actuating means are provided centrally at the front edge of the seat squab affords the advantage that the respective seat occupant is in fact sitting in the seat in the customary position in relation thereto during the weight adjustment procedure and is thus uniformly loading the seat squab, while the weight adjustment actuating means is readily accessible and can be actuated with optimum ease by virtue of its central arrangement at the front edge of the seat squab.

In accordance with a preferred feature of the invention the level indicator means includes an elongate flexible element disposed in a mechanically prestressed condition by means of a spring member between the base structure and the seat squab, and an indicator member operatively associated with the elongate flexible element.

In accordance with another preferred feature the elongate flexible element can include a pointer and the indicator member can have a viewing opening into which the pointer projects. In that case, the elongate flexible element can be formed by any suitable element such as for example a wire, a cable, a cord or the like. The pointer is suitably fixed to the elongate flexible element.

Preferably the viewing opening of the indicator member, into which the pointer projects, is provided at its edge with a marking which so-to-speak forms a scale. The marking can be formed by colored regions of different colors, symbols in combination with color markings, or other suitable forms of marker. For example the optimum range in respect of the seat squab level can be marked in green or yellow. A red area can be disposed adjoining that optimum range of seat squab level, to the right and to the left thereof respectively, in order to provide a simple indication that the vehicle seat is not at its optimum adjustment when the pointer is in one of the two red areas. The areas which are outside the optimum range of the seat squab level can also be clearly represented for example by the symbol of a small person and a large person respectively. It will be appreciated that it is also possible to envisage using other forms of marking or symbol.

In accordance with the invention therefore the indicator member can include a marking for the seat level or height which optimally corresponds to the respective seat occupant, in relation to the spring travel.

Likewise it is possible for the elongate flexible element to include a marker for the seat level or height optimally corresponding to the respective seat occupant, in relation to the seat travel, wherein the indicator member has a relatively small viewing opening for the elongate flexible element.

While in the embodiment of the level indicator means set forth hereinbefore, with a pointer, the viewing opening of the indicator member is of sufficient longitudinal extent, in the last-discussed embodiment in which the elongate flexible element has a marker for the seat level optimally corresponding to the respective seat occupant, in relation to the spring travel, the viewing opening can be of relatively short size in order to provide a correspondingly accurate indication of the adjusted setting.

In a preferred embodiment of the invention, more particularly for example in relation to a vehicle seat of the kind last mentioned above, the elongate flexible element can be formed by a strip, with the indicator member having a viewing opening for the strip. Such a strip is simple to design, with suitable markings in the form of colored areas or in the form of icons, geometrical figures or the like.

In accordance with another preferred feature of the invention the indicator member can be provided at least substantially centrally at the front edge of the seat squab. A vehicle seat of such a design configuration enjoys the advantage that the seat occupant is sitting straight and thus in the customary position on the vehicle seat during the weight adjustment procedure, and is viewing forwardly and downwardly to look at the indicator member so that the respective weight of the seat occupant is in actual fact uniformly and symmetrically acting on the vehicle seat. For the same reason, another preferred feature of the invention provides that the weight adjustment actuating means is associated with the indicator member at the front edge of the seat squab, that is to say it is arranged centrally, because then, during actuation of the actuating means for setting the vehicle seat appropriately to the weight of the respective seat occupant, the seat occupant is sitting upright on the seat and is thus uniformly loading the vehicle seat.

In a preferred feature of the invention the weight adjustment actuating means can include a handle reciprocatable between an inactive position in which it fits around or closely encloses the indicator member and an active position of being spaced from the indicator member. In the inactive position the handle of the weight adjustment actuating means is not noticeable on the vehicle seat in such a way as to cause a nuisance or spoil the look of the seat. In the active position of being spaced from the indicator member the handle can be pivoted up and down with a pumping movement for example about a horizontal pivot axis through a defined pivot angle in order in that case to suitably adjust the spring arrangement of the vehicle seat in a stepwise manner. That can occur both in the direction of a light-weight seat occupant and also in the direction of a heavy-weight seat occupant, that is to say for example in a weight range of between 50 and 130 kg.

In accordance with another preferred feature of the invention the handle can be reciprocatingly displaceable between the inactive position and the active position by a linear movement, that is to say in the longitudinal direction of the seat, and in the active position the handle is pivotable up and down about a horizontal pivot axis for stepwise pumping adjustment of the spring arrangement provided for weight adjustment.

Another possible configuration according to the invention provides that the handle is displaceable with a reciprocating movement about a vertical axis between the inactive position and the active position and in the active position can be pivoted up and down about a horizontal pivot axis for stepwise pumping adjustment of the spring arrangement for weight adjustment purposes.

Further objects, features and advantages will be apparent from the description hereinafter of a preferred embodiment of the vehicle seat according to the invention.

BRIEF DESCRIPTION OF THE DRAWING

FIG. 3 is a highly diagrammatic perspective view of the vehicle seat shown in FIG. 1, FIG. 4 is a diagrammatic perspective view of part of the vehicle seat shown in FIGS. 1 and 2, showing an embodiment of the level indicator means, FIG. 5 is a view similar to FIG. 4 showing another embodiment of the level indicator means for the vehicle seat of FIGS. 1 and 3, and FIG. 6 is a perspective view of a preferred embodiment of a weight adjustment actuating means of the vehicle seat of FIG. 1 or 3 with the level indicator means diagrammatically shown in FIG. 4.

DESCRIPTION OF THE PREFERRED EMBODIMENT

Figure 1:
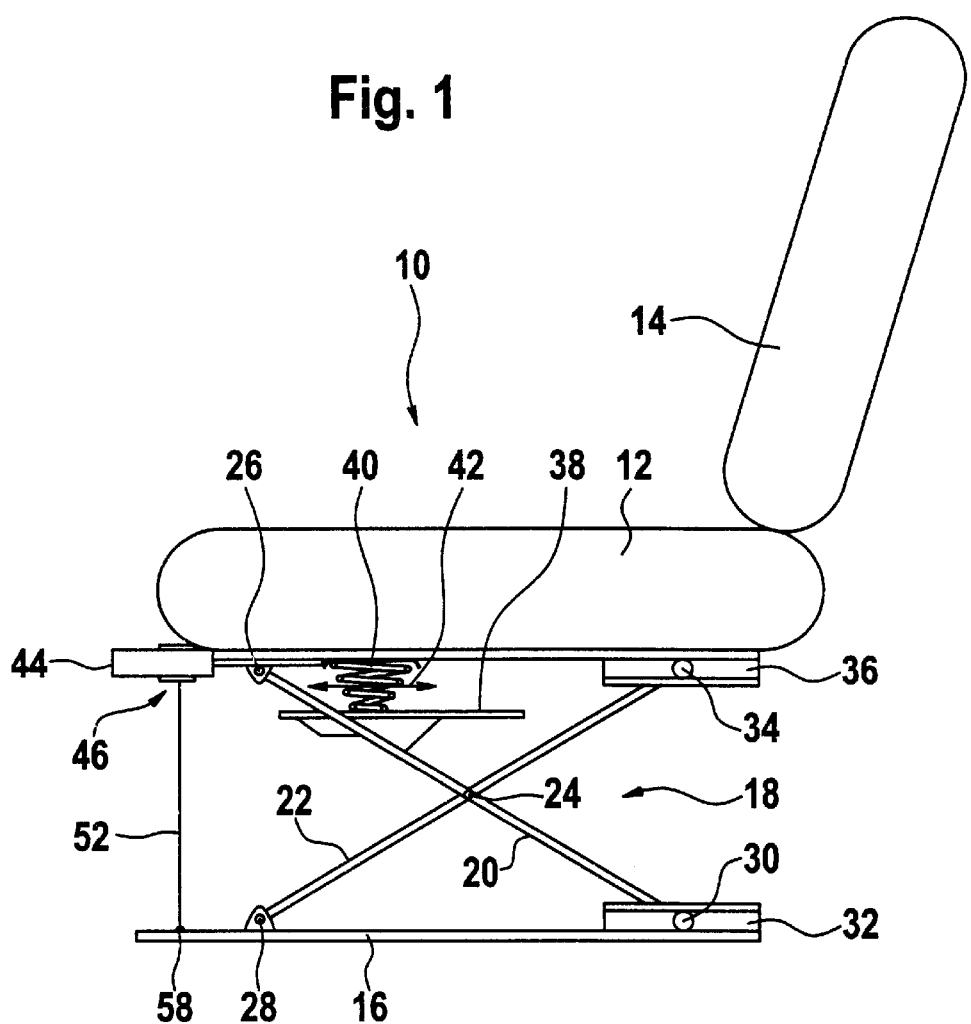
FIG. 1 is a diagrammatic side view of an embodiment of a vehicle seat according to the invention.

Referring firstly to FIG. 1, diagrammatically shown therein as a side view is an embodiment of a vehicle seat 10 according to the invention, for example a motor vehicle seat, which has a seat squab indicated generally at 12 and a backrest indicated generally at 14. The vehicle seat comprises a base structure 16 for supporting the seat on a suitable support surface. Reference 18 generally indicates a scissor-type support assembly operatively disposed between the base structure 16 and the seat squab 12. The scissor support assembly 18 comprises a pair of first lateral scissor members 20 and a pair of second lateral scissor members 22. The first and second scissor members 20 and 22 are pivotably connected together by means of a connecting spindle 24. The first scissor members 20 are pivotably mounted by their one end 26, which is the upper end in FIG. 1, to the seat squab 12. The second scissor members 22 are pivotably mounted by their first end 28, which is the lower end in FIG. 1, to the base structure 16. The second ends 30 of the first scissor members 20 are linearly movably guided along linear guides indicated at 32 in FIG. 1, on the base structure 16. Similarly the second ends of the second scissor members 22, which are the upper ends in FIG. 1, are linearly movably guided along linear guides 36 carried on the seat squab 12 at the underside thereof.

Fixed between the two first scissor members 20 is a flat member 38, for example in the form of a plate, which is oriented in parallel relationship with the underside of the seat squab 12. Reference 40 denotes a spring arrangement, illustrated by way of example in the form of a coil spring, which is operatively disposed between the underside of the seat squab 12 and the flat member 38 and which is displaceable with a reciprocating movement in the longitudinal direction of the vehicle seat 10 for the purposes of weight adjustment of the vehicle seat. Such displacement of the spring arrangement 40 is indicated in FIG. 1 by a double-headed arrow 42.

If the vehicle seat 10 is occupied by a seat occupant of relatively light weight, the spring arrangement 40 is displaced towards the first ends 26 of the scissor members 20. If on the other hand a seat occupant of heavier weight is sitting on the vehicle seat 10, the seat occupant displaces the spring arrangement 40 away from the first ends 26 in order to suitably adjust the vehicle seat 10 to the weight of that respective seat occupant. For the purposes of displacement of the spring arrangement 40 in the direction of the double-headed arrow 42, the spring arrangement 40 is connected to a weight adjustment actuating means which is generally identified by reference 44 in FIG. 1 and which will be described in greater detail hereinafter with reference to FIG. 6.

So that the seat occupant who is sitting on the vehicle seat 10 actually adjusts the vehicle seat 10, in terms of its oscillation or springing characteristic, to the actual weight of the seat occupant in the optimum fashion, the vehicle seat 10 has a level indicator means which is generally indicated at 46 in FIG. 1, for showing the setting of the seat squab 12 to the seat squab level or height optimally corresponding to the weight of the respective seat occupant, in relation to the spring travel of the seat squab 12. Two embodiments of the level indicator means 46 are diagrammatically shown in FIGS. 4 and 5 while FIG. 6 shows a level indicator means 46, which in principle corresponds generally to the embodiment of FIG. 4, in conjunction with the preferred form of the weight adjustment actuating means 44. Reference will be made hereinafter to FIGS. 4 through 6 in this respect.

Figure 2:
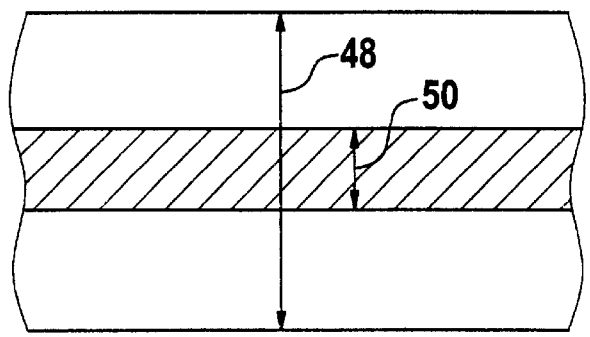
FIG. 2 is a diagrammatic illustration of the oscillation travel of the seat squab with respect to the base structure of the vehicle seat of FIG. 1, and the optimum adjustment range of the spring arrangement of the FIG. 1 vehicle seat, which is at the center of that overall oscillation travel.

Looking now at FIG. 2, shown as a diagrammatic view therein is the total oscillation travel, as indicated by a double-headed arrow 48, of the seat squab 12 with respect to the base structure 16 of the vehicle seat 10. The hatching and the double-headed arrow 50 in FIG. 2 denote the optimum adjustment region of the spring arrangement 40, being at least substantially at the center of that total oscillation travel 48.

FIG. 3 is a perspective view showing an embodiment of the vehicle seat 10 according to the invention, and will be described in greater detail hereinafter.

Going on now to FIG. 4, diagrammatically shown therein is a portion of the seat squab 12 and the base structure 16 of the vehicle seat 10 according to the invention, and an embodiment of the level indicator means 46. The level indicator means 46 has an elongate flexible element 52 connected to a spring member 54 shown in the form of a coil spring. The elongate flexible element 52 is formed by a wire 56 which is fixed by one end 58 thereof to the base structure 16 by any suitable means. The second end 60 of the wire 56 is connected to one end of the spring member 54. The other end of the spring member 54, as indicated at 62, is fixed to the seat squab 12 by any suitable means. The elongate flexible member 52, in the illustrated embodiment this being the wire 56, and the spring member 54, are so dimensioned that in the assembled condition of the level indicator means 46, the spring member 54 is mechanically stressed. It will be seen that the wire 56 passes around a direction-changing member 64 mounted to the seat squab 12.

Reference 66 in FIG. 4 indicates a pointer which is fixed to the wire 56 and which projects into a viewing opening 68 afforded by an indicator member 70 which is fixed to the seat squab 12 at the front edge thereof at least substantially centrally thereof. The indicator member 70 which therefore forms so-to-speak a scale member is provided with a marking 74 at an edge 72 of the viewing opening 68. The marking 74 has a central region indicated by hatching and reference 76 in FIG. 4, which for example is colored green or yellow. Disposed adjoining that central region 76 to the right and to the left thereof are respective outer regions 78 which for example are colored red. The central region 76 corresponds to the optimum adjustment range indicated at 50 in FIG. 2.

When therefore the pointer 66 is in the central region 76, the seat occupant has adjusted the vehicle seat 10 to the seat squab level which optimally corresponds to the weight of the respective seat occupant. That adjustment is effected by the weight adjustment actuating means 44 as is diagrammatically shown in FIG. 1.

Referring now to FIG. 5, shown therein as a perspective view similar to that in FIG. 4 is a part of the vehicle seat 10, illustrating the base structure 16 and the seat squab 12, together with another embodiment of the level indicator means 46. The level indicator means 46 has an elongate flexible member indicated generally at 52, which is formed by a strip or band 80, referred to hereinafter for the sake of simplicity as the strip 80. The strip 80 is fixed by means of one end 82 thereof to the base structure 16 by any suitable means. The second end 83 of the strip 80 is connected by suitable means to a spring member 54. The spring member 54 is fixed by means of its end remote from the end 83 of the strip 80, to the seat squab 12. The strip 80 and the spring member 54 are so dimensioned that in the assembled condition of the level indicator means 46 the spring member 54 is mechanically stressed.

The elongate flexible element 52 in the form of the strip 80 extends through an indicator member 84 which has a viewing opening 86 which is short in comparison with the design configuration shown in FIG. 4. In this embodiment of the level indicator means 46, it is not the indicator member 84' that is provided with a marking at the edge of the viewing opening 85, but instead the strip 80 itself has a marking indicated by hatching and reference 88 in FIG. 5. That marking 88 again has a central region 90 which is colored green, yellow or other suitable color or is provided with a suitable symbol and which is adjoined to the right and to the left thereof by respective outer regions as indicated at 92. When the central region 90 of the marking 88 is in the viewing opening 86 of the indicator member 84, that means that the vehicle seat 10 is optimally adjusted to the actual weight of the seat occupant occupying the vehicle seat 10, in terms of the oscillation characteristics thereof. If one of the two outer regions 92 of the marking 88 is in the viewing opening 86, then the seat occupant should suitably actuate the weight adjustment actuating means 54 in order so to displace the spring arrangement 40 as to provide for suitable weight adjustment and an optimum springing effect.

Returning now to FIG. 3, shown therein is a perspective view of a design configuration of a vehicle seat 10 with a seat squab 12 and a backrest 14. FIG. 3 also clearly shows that the indicator member which is indicated at 70 in FIG. 4 and at 84 in FIG. 5 of the level indicator means 46 is provided centrally at the edge 94 of the seat squab 12, which is the front edge of the seat squab 12. It will be noted in this respect that the reference to the front edge of the seat squab 12 means the edge remote from the backrest 14, that is to say the edge which is the front edge as considered in the direction in which the seat occupant for example would be looking when sitting in the customary position in the seat. The edge 94 will therefore be the front edge of the seat squab 12, even if for example the vehicle seat 10 were to be mounted to a vehicle in such a way as to be facing rearwardly of the vehicle.

The weight adjustment actuating means 44 is operatively associated with the indicator member 70 or 84 of the level indicator means 46. The weight adjustment actuating means 44 has a generally loop-shaped handle 96 which is displaceable between an inactive position shown in FIG. 3 and an active position of being spaced from the indicator member 70 or 84. That active position is the position shown in FIG. 6. Looking therefore now at FIG. 6, shown therein as a perspective view are a preferred structure for the weight adjustment actuating means 44 and a configuration of the level indicator means 46, similar to the configuration diagrammatically shown in FIG. 4. The level indicator means 46 has an indicator member 70 with an elongate viewing opening 68. Projecting into the viewing opening 68 is a pointer 66 which is suitably fixed to a wire 56 forming the elongate flexible element referred to above. The wire 56 is deflected around two direction-changing members indicated at 64, which project away from a mounting body 98.

The wire 56 is fixed by one end thereof (not visible in FIG. 6) to the base structure indicated at 16 in for example FIG. 4 of the vehicle seat 10. The second end of the wire 56 is connected to a spring member corresponding to the spring member 54 in each of FIGS. 4 and 5, which in this embodiment is fixed to the underside of the mounting body 98. The mounting body 98 is mounted to the seat squab 12 by suitable fixing means.

The mounting body 98 has bearing recesses 100 which serve for pivotably supporting a bearing spindle 102. Sleeve elements 104 are carried on the bearing spindle 102 in such a way as to project therefrom at a spacing from each other and oriented in mutually parallel relationship. Leg members 106 extend movably through the two sleeve elements 104 and are connected together at their respective ends remote from the mounting body 98, to form a generally U-shaped hoop configuration 108. The handle 96 of the weight adjustment actuating means 44 is mounted to the U-shaped hoop configuration 108.

If the handle 96, when in its active position, is pivoted up and down with a pumping movement about the bearing spindle 102, as is indicated in FIG. 6 by the double-headed arcuate arrow 110, an actuating member 114 connected to the bearing spindle 102 by a fork connection 112 is moved linearly with a reciprocating movement. This is indicated by the double-headed arrow 116. The actuating member 114 resiliently carries ratchet elements 118 which co-operate with linear tooth arrangements 120 of an adjusting member 122 in such a way that, upon a corresponding oscillating movement of the actuating member 114, the adjusting element 112 is adjusted stepwise either towards the left or stepwise towards the right. The stepwise displacement of the adjusting element 122 towards the left is indicated by the arrow 124 and the stepwise displacement towards the right is indicated by the arrow 126. The spring arrangement 40 in FIG. 1 is connected to the adjusting element 122 so that, by virtue of oscillating pivotal movement of the handle 96, it is possible to displace the spring arrangement 40 towards the first ends of the scissor members 20 or away therefrom in order to adjust the vehicle seat 10 in the optimum fashion to the weight of the respective seat occupant. In that respect, the optimum weight or springing setting is attained when the pointer 66 of the level indicator means 46 is in the optimum adjustment region 50 as indicated in FIG. 2, that is to say in the central region 76 of the marker 74, or the central region 90 of the marker 88.

It will be noted at this point that an adjusting arrangement of the kind described with reference to FIG. 6 is described in fuller detail in DE 100 39 501.5 to which reference is accordingly directed for appropriate incorporation thereof.

It will be appreciated that the above-described embodiment of the invention has been set forth solely by way of example and illustration of the principles thereof and that various other modifications and alterations may be made therein without thereby departing from the spirit and scope of the invention.

What is claimed is:

1. A vehicle seat comprising:
a base structure;
a seat squab supported on the base structure;
a spring arrangement for weight adjustment, operatively disposed between the base structure and seat squab;
a weight adjustment actuating means connected to the spring arrangement for weight adjustment; and
a level indicator means operatively associated with the weight adjustment actuating means for indicating adjustment of the seat squab to the seat squab level optimally corresponding to the weight of the respective seat occupant in relation to the spring travel of the seat squab, said level indicator means including an elongate flexible element connected between the base structure and the seat squab, a spring member mechanically prestressing the elongate flexible element, and an indicator member operatively associated with said elongate flexible element, and wherein the level indicator means and the weight adjustment actuating means are provided at least substantially centrally at the front edge of the seat squab.

2. A vehicle seat as set forth in claim 1
wherein said elongate flexible element includes a pointer and the indicator member has an elongate viewing opening into which the pointer projects.

3. A vehicle seat as set forth in claim 2
wherein the elongate flexible element is formed by a wire.

4. A vehicle seat as set forth in claim 2
wherein the indicator member includes a marking for the seat level which optimally corresponds to the respective seat user in relation to the spring travel of the seat squab.

5. A vehicle seat as set forth in claim 1
wherein the elongate flexible element includes a marker for the seat level optimally corresponding to the respective seat occupant in relation to the spring travel of the seat squab, and
wherein the indicator member has a small viewing opening for the elongate flexible element.

6. A vehicle seat as set forth in claim 5
wherein the elongate flexible element is formed by a strip.

7. A vehicle seat as set forth in claim 1
wherein the indicator member is disposed at least substantially centrally at the front edge of the seat squab.

8. A vehicle seat as set forth in claim 1
wherein the weight adjustment actuating means includes a handle displaceable between an inactive position adjacent to the indicator member and an active position of being spaced from the indicator member.

9. A vehicle seat as set forth in claim 8 including
mounting means mounting the handle reciprocatingly displaceably between the inactive position and the active position linearly in the longtitudinal direction of the seat, and
pivotal mounting means the handle in the active position pivotably up and down about a horizontal pivot axis for stepwise adjustment of the spring arrangement for weight adjustment.

10. A vehicle seat as set forth in claim 8 including
mounting means mounting the handle reciprocatingly displaceably about a vertical axis between the inactive position and the active position, and
pivotal mounting means mounting the handle in the active position pivotably up and down about a horizontal pivot axis for stepwise adjustment of the spring arrangement for weight adjustment.

* * * * *